March 3, 1964     I. W. PATERSON     3,122,928
FLEXIBLE TOOTH GEARING ARRANGEMENT
Filed Jan. 19, 1960     2 Sheets-Sheet 1

Inventor
Ira W. Paterson
Attorney

March 3, 1964     I. W. PATERSON     3,122,928

FLEXIBLE TOOTH GEARING ARRANGEMENT

Filed Jan. 19, 1960     2 Sheets-Sheet 2

Inventor
Ira W. Paterson
Attorney

United States Patent Office 3,122,928
Patented Mar. 3, 1964

3,122,928
FLEXIBLE TOOTH GEARING ARRANGEMENT
Ira W. Paterson, Milton, Mass., assignor to Allis-Chalmers Manufacturing Company, Milwaukee, Wis.
Filed Jan. 19, 1960, Ser. No. 3,286
9 Claims. (Cl. 74—2)

This invention relates to a transmisison mechanism and more particularly to a new and improved gear and gearing arrangement therefor.

In accordance with the invention claimed a new and improved transmission gearing is provided comprising in combination a driving shaft, a supporting or bearing shaft, a first gear fastened on the driving shaft and a second gear mounted on the bearing shaft. The first and second gears are arranged in meshing engagement during at least a part of their rotation. The second gear is provided with teeth continuously along only a part of its periphery. Some of the teeth at one end of the span of teeth are formed of flexible material. Means are provided for biasing the flexible teeth into meshing engagement with the first gear at the beginning of each cycle of cooperative movement of the gears.

It is, therefore, one object of this invention to provide a new and improved gear.

Another object of this invention is to provide a new and improved transmission mechanism.

A further object of this invention is to provide a new and improved transmission mechanism in which one or more flexible teeth on a gear are used to adjust the gear in proper meshing engagement with a pinion during the start of a gear driving operation.

A still further object of this invention is to provide a new and improved gearing arrangement in which a gear having at least one flexible tooth which is in meshing engagement with a pinion during only a part of its rotation is biased back to its original position where said flexible tooth is positioned in engagement with the pinon at the beginning of each cycle of rotation.

Objects and advantages other than those set forth will be apparent from the following description when read in connection with the accompanying drawing, in which.

Figure 1:
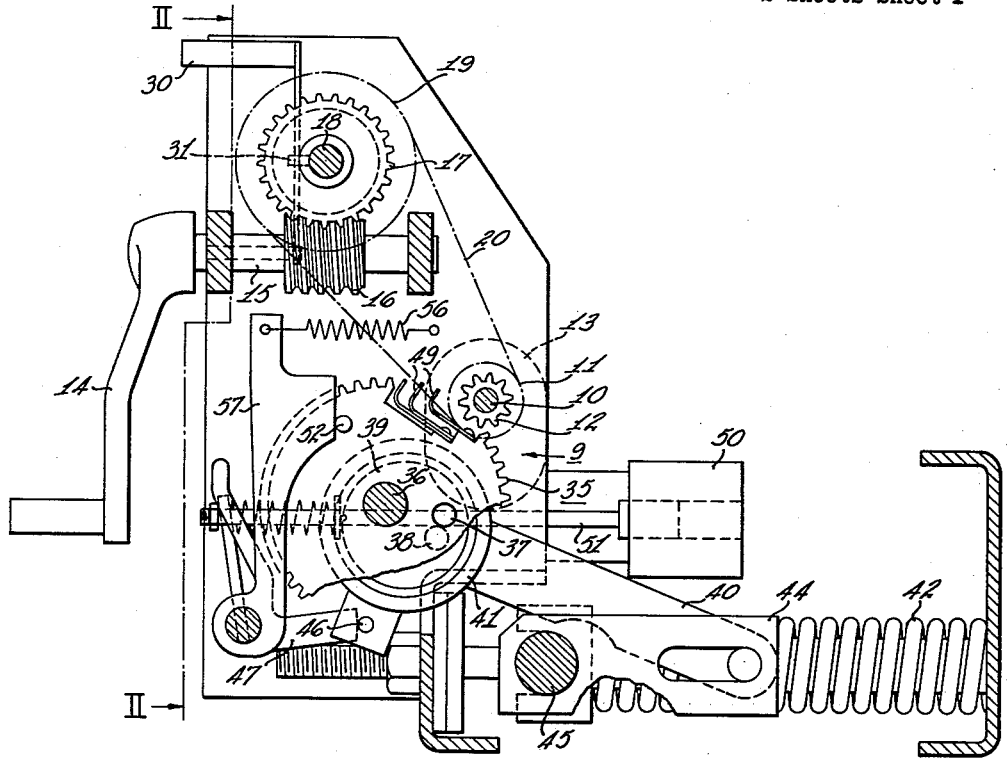
FIG. 1 is avertical cross sectional view partly in elevation of a gearing arrangement employing the present invention and showing the spring load in compressed position.
Figure 5:
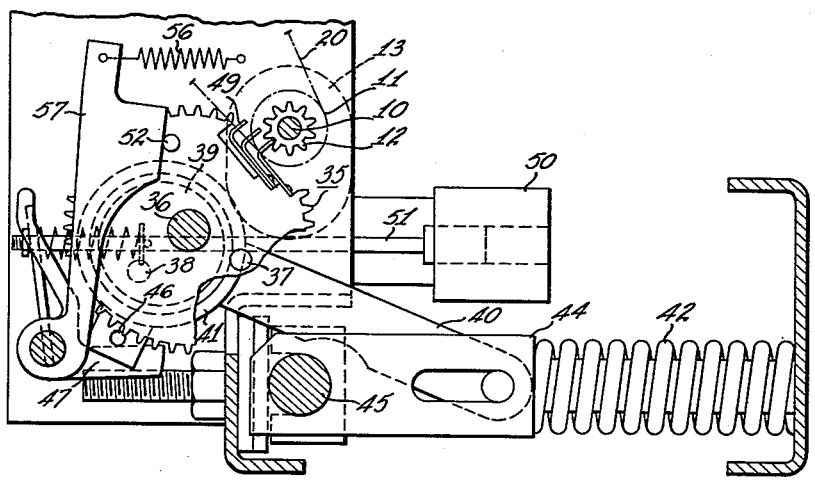
FIG. 5 is a partial cross sectional view partly in elevation of the structure shown in FIG. 1 with the spring load in expanded position.
Figure 2:
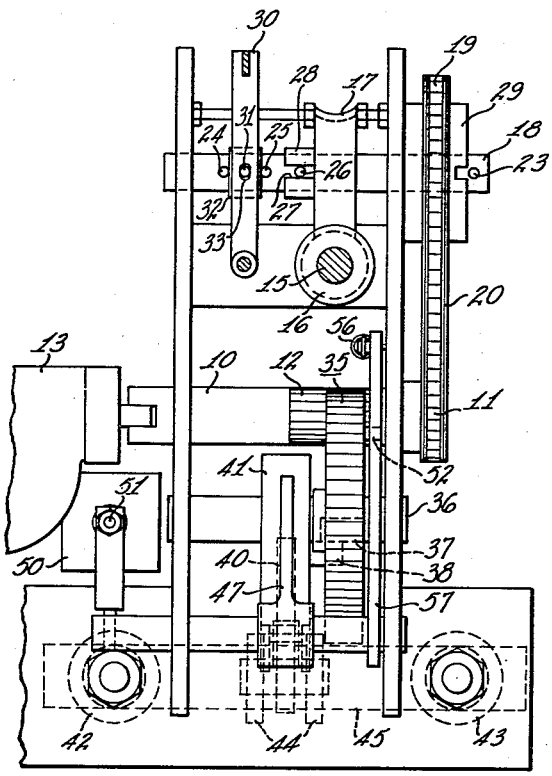
FIG. 2 is a front cross sectional view of the structure shown in FIG. 1 taken along the line II—II.

Referring more particularly to the drawings by characters of reference FIGS. 1, 2 and 5 illustrate a gearing mechanism 9 wherein pinion or driving shaft 10 has fixedly mounted thereon a first gear or sprocket 11 and a second gear or pinion 12. Shaft 10 is rotated by means of a suitable electric motor 13 or by means of a manually rotatable handle 14. Rotation of handle 14 delivers energy through shaft 15, worm 16 and worm gear 17 into shaft 18 to chain sprocket 19. A flexible drive chain 20 connecting sprockets 19 and 11 causes rotation of driving shaft 10 in the same manner as motor 13.

This manually integrated and actuating mechanism comprising shaft 15 and worm 16 is supported in such a manner that worm 16 is maintained in continuous engagement with worm gear 17 which is supported by, but not permanently attached to shaft 18. To shaft 18 are fastened pins 23, 24, 25 and 26. Pin 26 engages a slot 27 in hub 28 of worm gear 17 at all times while pin 23 may be caused to engage the slot in hub 29 of sprocket 19 by displacing shaft 18 to the left.

Displacement of shaft 18 is effected by movement of a selector lever 30 acting through a pin 31 and a block 32. Block 32 is supported by but not attached to shaft 18 and pin 31 extends from block 32 into a working slot 33 in lever 30. Block 32 is contained between pins 24 and 25 on shaft 18. In the position shown in FIG. 2 handle 14 is inoperative as far as conveying motion to driving shaft 10 since shaft 18 is disengaged from sprocket 19. In the manual driving position lever 30 is moved from the position shown in FIG. 2 to the left so that shaft 18 and sprocket 19 are interconnected. During the time that handle 14 is rotated to drive shaft 10 the shaft of the electric motor 13 is also rotated because they are directly connected together. Further, during the time that motor 13 is driving shaft 10 sprocket 19 and chain 20 are also driven although at this time lever 30 has disconnected shaft 18 therefrom.

Rotation of driving shaft 10 and gear 12 by chain 20 causes rotation of a gear 35 which is in meshing engagement therewith for at least a part of their rotation and may be, for example, rotatably mounted on or supported by bearing pin or bearing shaft 36. Gear 35 is provided with a driving pin 37 positioned to detachably engage with a corresponding pin 38 on an eccentric 39. Pins 37 and 38 are arranged on juxtapositioned surfaces of gear 35 and eccentric 39, respectively, for cooperative action. Eccentric 39 is supported by shaft 36 for rotation thereon. Rotation of gear 35 engages pin 37 on gear 35 with pin 38 on eccentric 39 which revolves eccentric 39 clockwise as shown in FIG. 1 about its fixed center, which is the center of shaft 36, driving a connecting rod 40 to the right. Connecting rod 40 is fixedly mounted on a housing 41 supported by eccentric 39 and rotatably movable therewith during at least a part of the cycle of rotation of eccentric 39, as is well known in the art.

The motion of connecting rod 40 to the right compresses or loads a pair of springs (stored energy devices) 42 and 43 as shown in FIGS. 1, 2 and 5 that function as a unit through link mechanism 44 and bar 45. At the instant that springs 42 and 43 are fully charged latch roll 46 affixed to housing 41 engages a prop latch means 47, thus holding or restraining the fully charged springs latched and ready to be discharged to perform a useful function, for example, closing the movable cooperating arcing contacts of a circuit breaker. The prop latch 47 may be released or triggered by a solenoid mechanism 50 which upon movement of its armature rod 51 to the right as shown in FIGS. 1 and 5 actuates prop latch 47 to rotate it clockwise releasing latch roll 46, housing 41 and connecting rod 40 to rotate under the force of springs 42 and 43. Once the stored energy or load springs 42 and 43 have been released the springs can again be recharged automatically by motor 13 or nonautomatically by handle 14 as explained above.

To prevent overloading of the spring charging system when latch roll 46 engages prop latch 47, gear 35 which is driven by gear 12 on the driving shaft 10 is shaped to disengage from gear 12 on shaft 10 at the fully charged position of the stored energy springs 42 and 43. This disengagement is accomplished by the removal of a segment of the teeth from the periphery of gear 35. Flexible teeth 49 (shown in FIGS. 1, 3 and 4) are provided at the end of the open segment to facilitate reengagement of the gears 12 and 35 at the start of each cycle of meshing engagement. As pin 38 on eccentric 39 is moved clockwise to the left as shown in FIG. 1 when connecting rod 40 is released for utilizing the stored energy of springs 42 and 43, gear 35 simultaneously becomes free to rotate and is caused to reengage with gear 12 and driving shaft 10 by a spring 56 attached to a bias lever 57 which acts against a pin 52 fixed to gear 35. As noted from the drawing, spring 56 is rendered ineffective to cause meshing of gears 12 and 35 while prop latch means 47 is restraining springs 42 and 43 from actuating the housing of the eccentric.

Figure 3:
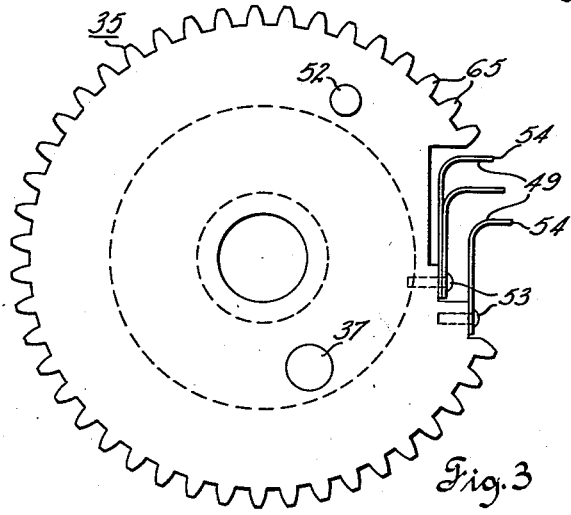
FIG. 3 is an enlarged front view of the gear employing the flexible teeth shown in FIG. 1.
Figure 4:
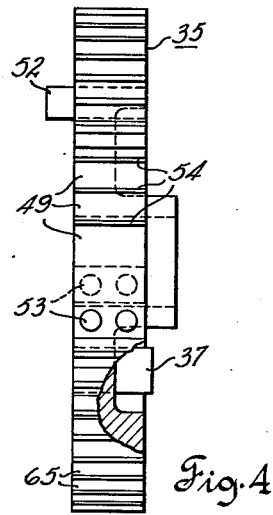
FIG. 4 is an end view of the structure shown in FIG. 3.

As shown in FIGS. 3 and 4 the flexible teeth 49 are detachably mounted along only a portion of a second part of the periphery of gear 35 by means of bolts 53 which may threadedly engage with suitable openings along the periphery of the gear structure. Teeth 49 are shown as formed of overlapping metallic strip material of resilient properties which are so arranged as to have spaced tooth gear edges 54. Although teeth 49 are described as being of metallic material it is intended that this disclosure cover resilient teeth formed of any suitable material. The span of flexible teeth are arranged in the open segment of the tooth periphery of gear 35 adjacent one end of the normal gear teeth 65 of gear 35. Gear teeth 65 arranged along a first part of the periphery of gear 35 have solid tooth segments while teeth 49 are flexible so as to yield if necessary upon engagement with the teeth on pinion or gear 12 or upon initial movement of shaft 10 to automatically position gears 12 and 35 in proper meshing engagement at the start of each driving cycle of shaft 10.

Although three flexible teeth 49 are shown in the drawings any number of flexible teeth may be used such as, for example, one or more. Teeth 49 are shown as comprising teeth formed out of flexible material although it is intended to be included within the scope of this disclosure to utilize one or more solid face teeth flexibly mounted so that the flexibly mounted teeth when positioned for engagement with the teeth of gear 12 at the start of each cycle of operation of driving shaft 10 will automatically position themselves with the teeth on gear 12. This arrangement of flexible teeth at the initially engaging end of a span of teeth provides unimpeded and undamaging reengagement of the charging motor pinion gear 12 with the charging mechanism for springs 42 and 43 immediately after each energy releasing action of the prop latch mechanism 47.

Although but one embodiment of the present invention has been illustrated and described, it will be apparent to those skilled in the art that various changes and modifications may be made without departing from the spirit of the invention or from the scope of the appended claims.

Having now particularly described and ascertained the nature of my said invention and the manner in which it is to be performed, I declare that what I claim is:

1. A gear having teeth extending around a first part of its periphery, each of said teeth in said first part being fixedly arranged, a plurality of flexible teeth formed from resilient strip material mounted around a second part of the periphery of the gear, said flexible teeth being detachably mounted in spaced arrangement adjacent the teeth in said first part, said flexible teeth yielding if necessary upon engagement with a pinion to automatically position the gear in proper meshing engagement with the pinion.

2. A gear having teeth extending around a first part of its periphery, each of said teeth in said first part having a solid tooth segment, a plurality of flexible overlapping metallic strip material members forming a plurality of teeth mounted around at least a second part of the periphery of the gear, said flexible teeth having tooth edges mounted in spaced arrangement adjacent the teeth in said first part, said flexible teeth yielding if necessary upon engagement with a pinion to automatically position the gear in proper meshing engagement with the pinion.

3. A transmission gearing comprising in combination a first driving shaft, a second shaft, a first gear fastened on said driving shaft, a second gear mounted on said second shaft, said first and second gears being in meshing engagement during at least a part of their rotation, said second gear being provided with a span of teeth along only a part of its periphery, a pluraliy of said teeth in said span being formed of resilient material and the remainder of said teeth in said span being formed of rigid material, and means for biasing at least one of said teeth formed of resilient material into meshing engagement with said first gear at the beginning of each cycle of cooperative movement of said gears, said teeth of said span formed of resilient material yielding upon initial movement of said driving shaft.

4. A transmission gearing comprising in combination a driving shaft, a bearing shaft, a first gear fastened on said driving shaft, a second gear rotatably mounted on said bearing shaft, said first and second gears being in meshing engagement during at least a part of their rotation, some of said teeth of said second gear being formed of flexible material, an eccentric mounted on said bearing shaft, means for detachably connecting together said second gear and said eccentric for rotation in a first direction, a spring load, means for connecting said eccentric to said spring load, said second gear upon rotation in said first direction causing said eccentric to bias said spring load, means for restraining said eccentric and said spring load upon predetermined rotation of said second gear, means for triggering said restraining means to release said spring load causing said eccentric to rotate in a second direction, and means for biasing said flexible teeth of said second gear into meshing engagement with the teeth of said first gear at the beginning of each cycle of cooperative movement of said gears in said first direction.

5. A transmission gearing comprising in combination a driving shaft, a bearing shaft, a first gear fastened on said driving shaft, a second gear rotatably mounted on said bearing shaft, said first and second gears being in meshing engagement during at least a part of their rotation, some of said teeth of said second gear being formed of flexible material, an eccentric mounted on said bearing shaft, means for detachably connecting together said second gear and said eccentric for rotation in a first direction, a spring load, means for connecting said eccentric to said spring load, said second gear upon rotation in said first direction causing said eccentric to bias said spring load, means for restraining said eccentric and said spring load upon predetermined rotation of said second gear, means for triggering said restraining means to release said spring load causing said eccentric to rotate in a second direction, and means for biasing said flexible teeth of said second gear into meshing engagement with the teeth of said first gear at the beginning of each cycle of cooperative movement of said gears in said first direction, said biasing means being restrained by said restraining means simultaneously with said eccentric and said spring load until released by said triggering means.

6. A transmission gearing comprising in combination a driving shaft, a bearing shaft, a first gear fastened on said driving shaft, a second gear rotatably mounted on said bearing shaft, said first and second gears being in meshing engagement during at least a part of their rotation, said second gear being provided with teeth continuously along only a part of its periphery, some of said teeth at one end of the span of teeth being formed of flexible material, an eccentric mounted on said bearing shaft, means for detachably connecting together said second gear and said eccentric for rotation in a first direction, a spring load, means for connecting said eccentric to said spring load, said second gear upon rotation in said first direction causing said eccentric to bias said spring load, means for restraining said eccentric and said spring load upon predetermined rotation of said second gear, means for triggering said restraining means to release said spring load causing said eccentric to rotate in a second direction, and means for biasing said flexible teeth of said second gear into meshing engagement with the teeth of said first gear at the beginning of each cycle of cooperative movement of said gears in said first direction.

7. A transmission gearing comprising in combination a driving shaft, a bearing shaft, a first gear fastened on said driving shaft, a second gear rotatably mounted on said bearing shaft, said first and second gears being in meshing engagement during at least a part of their rotation, said second gear being provided with teeth continuously along only a part of its periphery, some of said teeth at one end of the span of teeth being formed of flexible material, an eccentric mounted on said bearing shaft, a pair of cooperating pins, each of said pins being mounted on a different one of the juxtapositioned surfaces of said second gear and said eccentric, a spring load, means for connecting said eccentric to said spring load, said second gear upon rotation thereof in a first direction causing said pins to engage each other to rotate said eccentric to bias said spring load, means for restraining said eccentric and said spring load upon predetermined rotation of said second gear in said first direction, means for triggering said restraining means to release said spring load causing said eccentric to rotate in a second direction, and means for biasing said flexible teeth of said second gear into meshing engagement with the teeth of said first gear at the beginning of each cycle of coperative movement of said gears in said first direction.

8. A transmission gearing compirsing in combination a driving shaft, a bearing shaft, a first gear fastened on said driving shaft, a second gear rotatably mounted on said bearing shaft, said first and second gears being in meshing engagement during at least a part of their rotation, said second gear being provided with teeth continuously along only a part of its periphery, some of said teeth at one end of the span of teeth being formed of flexible material, an eccentric mounted on said bearing shaft, a pair of cooperating pins, each of said pins being mounted on a different one of the juxtapositioned surfaces of said second gear and said eccentric, a spring load, means for connecting said eccentric to said spring load, said second gear upon rotation thereof in a first direction causing said pins to engage each other to rotate said eccentric to bias said spring load, means for restraining said eccentric and said spring load upon predetermined rotation of said second gear in said first direction, means for triggering said restraining means to release said spring load causing said eccentric to rotate in a second direction, said pins of said second gear and said eccentric disengaging upon movement in said direction, and means for biasing said flexible teeth of said second gear into meshing engagement with the teeth of said first gear at the beginning of each cycle of cooperative movement of said gears in said first direction.

9. A gear having teeth extending around a first part of its periphery, each of said teeth in said first part having a solid tooth segment, a plurality of flexible overlapping metallic strip material members forming a plurality of teeth mounted around at least a second part of the periphery of the gear, said flexible teeth having tooth edges mounted in spaced arrangement adjacent the teeth in said first part, said flexible teeth yielding if necessary upon engagement with a pinion to automatically position the gear in proper meshing engagement with the pinion, and a single connection means for fastening more than one of said plurality of teeth to said gear.

References Cited in the file of this patent

UNITED STATES PATENTS

| | | |
|---|---|---|
| 290,299 | White | Dec. 28, 1883 |
| 674,447 | Mase | May 21, 1901 |
| 792,572 | Deeley et al. | June 13, 1905 |
| 1,127,942 | Theofanidis | Feb. 9, 1915 |
| 1,937,326 | Pick | Nov. 28, 1933 |
| 2,410,643 | Fielding | Nov. 5, 1946 |

FOREIGN PATENTS

| | | |
|---|---|---|
| 126,359 | Sweden | Oct. 11, 1949 |
| 637,983 | Great Britain | May 31, 1950 |
| 907,481 | Germany | Mar. 25, 1954 |

UNITED STATES PATENT OFFICE
CERTIFICATE OF CORRECTION

Patent No. 3,122,928                                March 3, 1964

Ira W. Paterson

It is hereby certified that error appears in the above numbered patent requiring correction and that the said Letters Patent should read as corrected below.

Column 5, line 28, for "coperative" read -- cooperative --; line 29, for "compirsing" read -- comprising --; column 6, line 10, after "said", second occurrence, insert -- second --.

Signed and sealed this 30th day of June 1964.

(SEAL)
Attest:

ERNEST W. SWIDER                                EDWARD J. BRENNER
Attesting Officer                                    Commissioner of Patents